(12) United States Patent
Weaver

(10) Patent No.: US 8,240,694 B1
(45) Date of Patent: Aug. 14, 2012

(54) TRAILER HITCH ALIGNMENT DEVICE

(76) Inventor: Kent Weaver, Enterprise, OR (US)

( * ) Notice: Subject to any disclaimer, the term of this patent is extended or adjusted under 35 U.S.C. 154(b) by 0 days.

(21) Appl. No.: 13/220,844

(22) Filed: Aug. 30, 2011

(51) Int. Cl.
 *B62D 53/06* (2006.01)
(52) U.S. Cl. ........................................ 280/477
(58) Field of Classification Search .............. 280/477, 280/511; 254/420
See application file for complete search history.

(56) References Cited

U.S. PATENT DOCUMENTS

| | | | |
|---|---|---|---|
| 3,596,925 A * | 8/1971 | Richie | 280/477 |
| 4,173,353 A | 11/1979 | Steele | |
| 5,085,408 A | 2/1992 | Norton et al. | |
| D338,644 S | 8/1993 | Winton | |
| 5,405,160 A * | 4/1995 | Weaver | 280/477 |
| 5,882,029 A | 3/1999 | Kennedy | |
| 6,086,083 A | 7/2000 | Wilks | |
| 6,951,345 B2 | 10/2005 | Wilks | |
| 2002/0117831 A1 * | 8/2002 | Ahlquist et al. | 280/477 |

* cited by examiner

*Primary Examiner* — Tony Winner
(74) *Attorney, Agent, or Firm* — Kyle Fletcher

(57) ABSTRACT

The trailer hitch alignment device aligns a trailer hitch onto a hitch ball from beneath both the trailer hitch and the hitch ball. The device includes an elongated strap that includes a hook, which temporarily hooks onto a bracket located beneath the hitch ball. The bracket bolts under the hitch ball. An alignment device is attached beneath the tongue of the trailer, and can rotate vertically there under and upon which the elongated strap wraps around, and in turn raises the trailer hitch to an elevation above the ball hitch. A hand crank located atop the tongue of the trailer, but behind the trailer hitch is manually wound to align the trailer hitch atop the hitch ball.

14 Claims, 5 Drawing Sheets

TRAILER HITCH ALIGNMENT DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of trailer hitches and trailers, more specifically, a device used to align and guide in a tongue of a trailer onto a trailer hitch of an attached vehicle.

B. Discussion of the Prior Art

As a preliminary note, it should be stated that there is an ample amount of prior art that deals with trailer hitch alignment devices. As will be discussed immediately below, no prior art discloses a trailer hitch alignment device that works beneath both the trailer hitch and the hitch ball to align and guide in the trailer hitch onto the hitch ball; wherein the device includes an elongated strap that hooks onto a bracket that is bolted beneath the hitch ball; wherein the elongated strap wraps around an alignment device that can rotate vertically beneath the tongue of the trailer so as to raise the trailer hitch to an elevation above the hitch ball; wherein a hand crank positioned behind the trailer hitch enables the elongated strap to be wound on in order to align the trailer hitch onto the hitch ball.

The Kennedy Patent (U.S. Pat. No. 5,882,029) discloses a device for aligning the tongue and hitch first portion on a trailer with the receiver and hitch; wherein the device includes a winch cable that pulls the receiver over the hitch ball. However, the winch cable is pulled atop the hitch ball via an alignment guide located above and behind the hitch ball as opposed to a device that aligns from underneath both the tongue and the hitch ball.

The Norton et al. Patent (U.S. Pat. No. 5,085,408) discloses a trailer hitch winch and guide mechanism that pulls the trailer hitch onto a receiver ball. However, the guide mechanism does not attach beneath an existing ball hitch and extend beneath the tongue portion of the trailer to raise the tongue above the hitch ball for the alignment process. Also, the winch and guide mechanism relies upon a wheeled jack to raise the tongue to the desired elevation.

The Steele Patent (U.S. Pat. No. 4,173,353) discloses a winch and cable mechanism that pulls a trailer hitch onto a receiver ball. However, the mechanism does not attach beneath the trailer hitch and rely upon a guide mechanism to rotate below the tongue of the trailer to lift said tongue in order to align the trailer hitch onto the receiver ball.

The Wilks Patent (U.S. Pat. No. 6,086,083) discloses a trailer hitch and guide mechanism in which a winch and cable is guided over the trailer hitch ball and onto the hitch receiver. However, the mechanism does not attach beneath the hitch ball and employ a guide mechanism that swings down below the tongue to raise the tongue of the trailer to the desired elevation prior to seating thereon.

The Wilks Patent (U.S. Pat. No. 6,951,345) discloses a hitch alignment device for aligning a ball and socket of a trailer hitch; wherein the alignment device includes a base with a winch and pivotable cable guide. Again, the alignment device does not work beneath both the hitch ball and tongue of the trailer.

The Winto Patent (U.S. Pat. No. Des. 338,644) illustrates an ornamental design for a vehicle guidance device, which does not attach beneath both the hitch ball and trailer tongue.

While the above-described devices fulfill their respective and particular objects and requirements, they do not describe a trailer hitch alignment device that works beneath both the trailer hitch and the hitch ball to align and guide in the trailer hitch onto the hitch ball; wherein the device includes an elongated strap that hooks onto a bracket that is bolted beneath the hitch ball; wherein the elongated strap wraps around an alignment device that can rotate vertically beneath the tongue of the trailer so as to raise the trailer hitch to an elevation above the hitch ball; wherein a hand crank positioned behind the trailer hitch enables the elongated strap to be wound on in order to align the trailer hitch onto the hitch ball. In this regard, the trailer hitch alignment device departs from the conventional concepts and designs of the prior art.

SUMMARY OF THE INVENTION

The trailer hitch alignment device aligns a trailer hitch onto a hitch ball from beneath both the trailer hitch and the hitch ball. The device includes an elongated strap that includes a hook, which temporarily hooks onto a bracket located beneath the hitch ball. The bracket bolts under the hitch ball. An alignment device is attached beneath the tongue of the trailer, and can rotate vertically there under and upon which the elongated strap wraps around, and in turn raises the trailer hitch to an elevation above the ball hitch. A hand crank located atop the tongue of the trailer, but behind the trailer hitch is manually wound to align the trailer hitch atop the hitch ball.

An object of the invention is to provide a trailer hitch alignment device that works from below the hitch ball and the trailer hitch.

A further object of the invention is to provide an elongated strap with a hook that clips or hooks onto a bracket secure beneath the hitch ball.

An even further object of the invention is to provide a bracket that bolts in with an existing hitch ball.

An even further object of the invention is to provide a hook that temporarily attaches the device onto the bracket, and which can easily be disconnected when no longer needed.

An object of the invention is to provide an alignment device that attaches beneath the tongue of the trailer, and which can rotate vertically to extend beneath the trailer hitch, and which has the elongate strap wrapped around so as to lift the trailer hitch to an elevation above that of the ball hitch.

A further object of the invention is to provide a hand crank that can manually wind the elongated strap thereon so as to align the trailer hitch onto the hitch ball without the need for a wheeled jack that is customarily used with a tongue of a trailer.

An even further object of the invention is to provide an alignment device that temporarily extends downwardly to provide elevational support to the trailer hitch, and which can easily fold flat under the tongue of the trailer when not in use.

These together with additional objects, features and advantages of the trailer hitch alignment device will be readily apparent to those of ordinary skill in the art upon reading the following detailed description of presently preferred, but nonetheless illustrative, embodiments of the trailer hitch alignment device when taken in conjunction with the accompanying drawings.

In this respect, before explaining the current embodiments of the trailer hitch alignment device in detail, it is to be understood that the trailer hitch alignment device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the trailer hitch alignment device.

It is therefore important that the claims be regarded as including such equivalent construction insofar as they do not depart from the spirit and scope of the trailer hitch alignment device. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 1 illustrates a perspective view of the trailer hitch, tongue of the trailer, hitch ball and receiver, and the alignment device attached there between;

DETAILED DESCRIPTION OF THE EMBODIMENT

Figure 1:
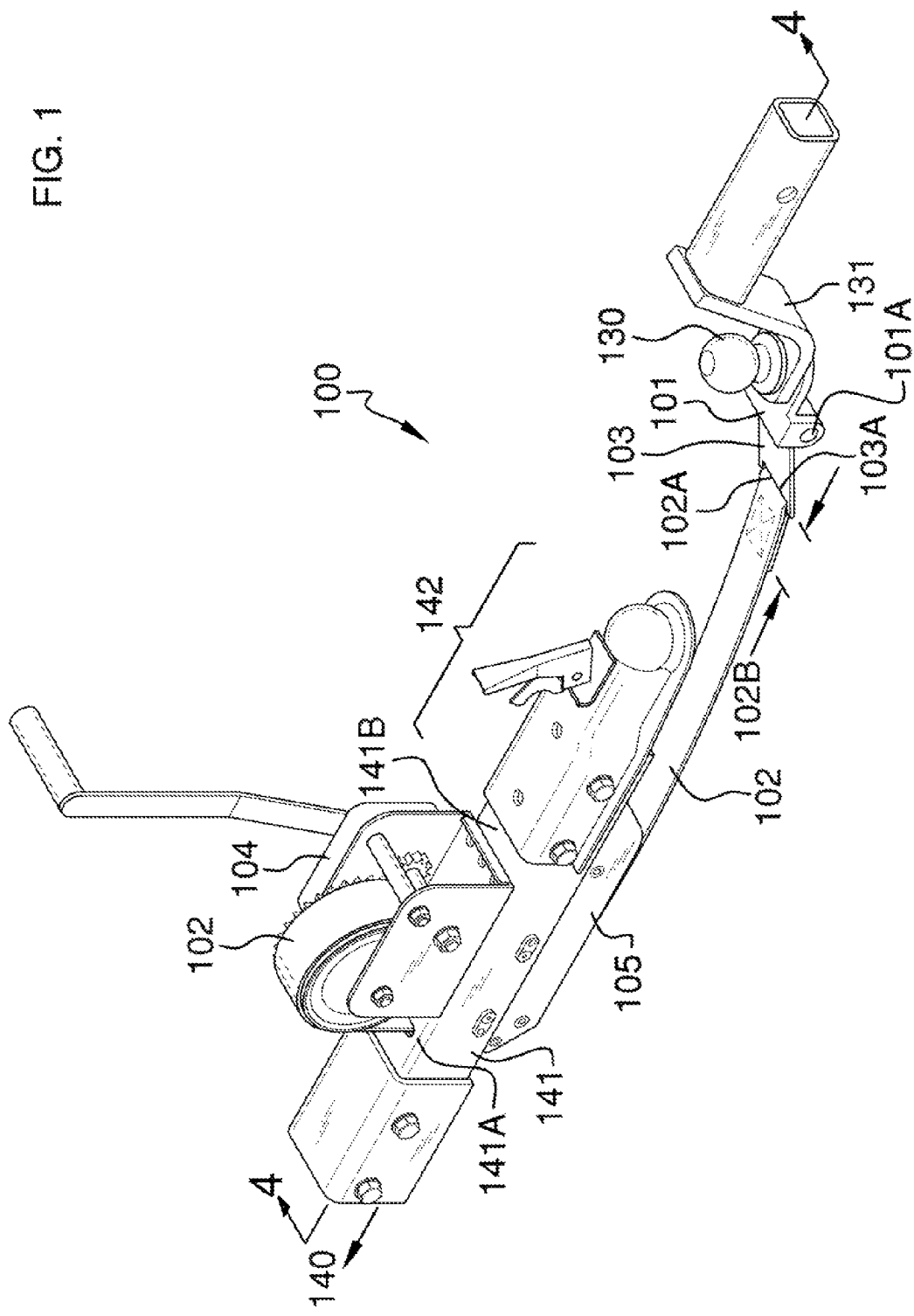
Figure 2:
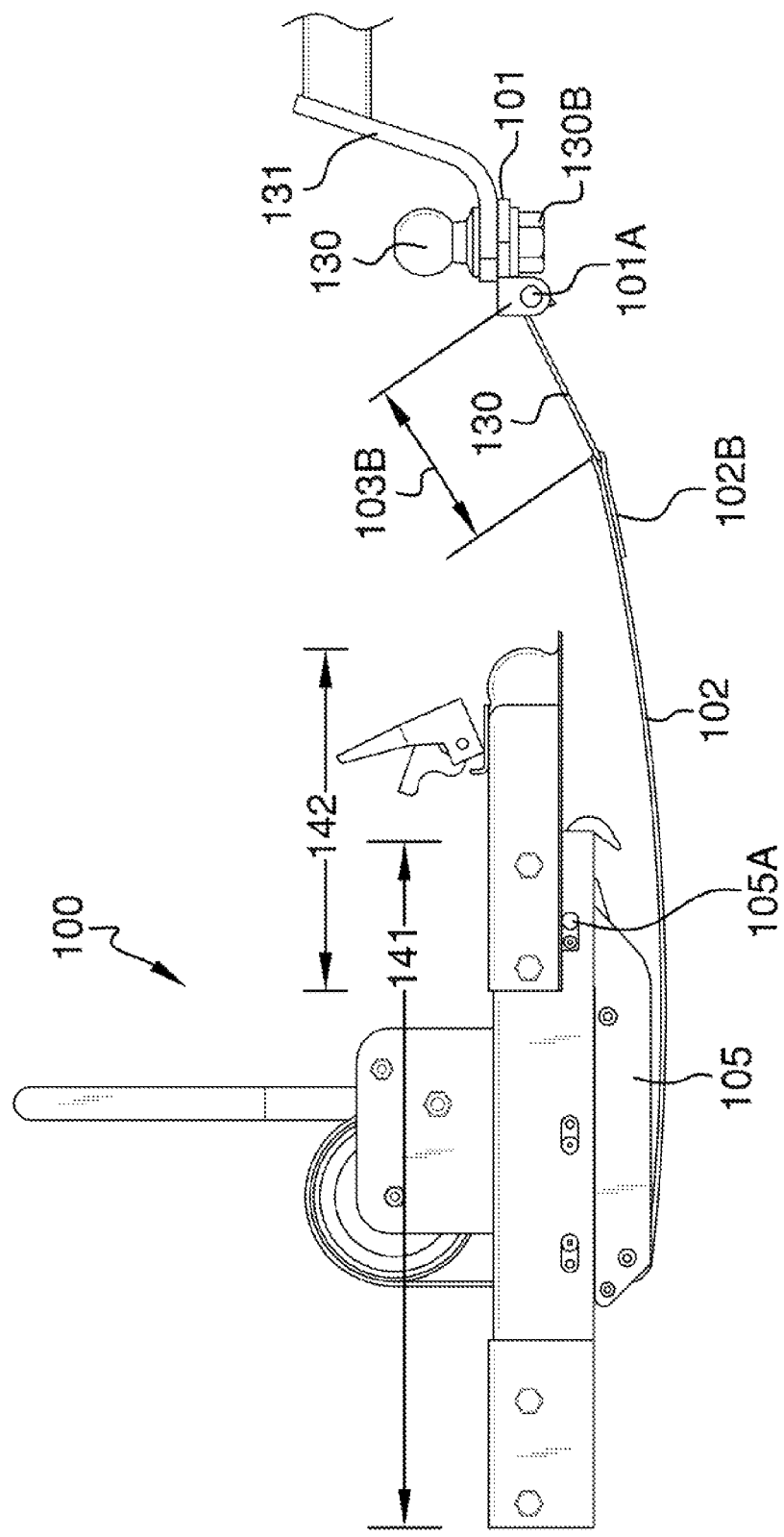
FIG. 2 illustrates a side view of the trailer hitch alignment device in which the elongated strap is extended and in which the hook is clipped onto the bracket located under the hitch ball, and wherein the alignment device is folded horizontal.
Figure 3A:
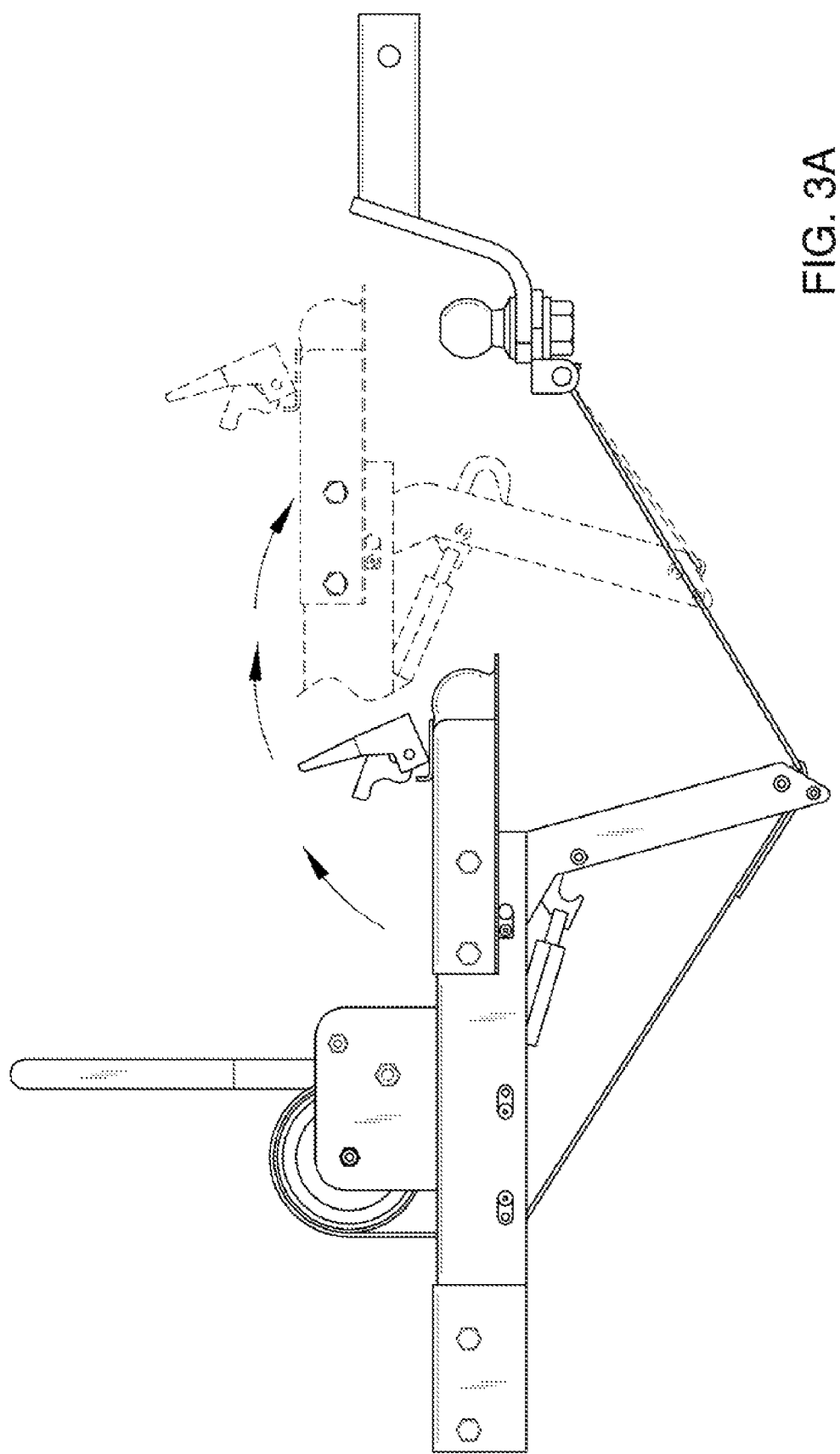
FIG. 3A illustrates a side view of the trailer hitch alignment device in which the alignment device is extended downwardly from the trailer tongue and the elongated strap is extended to connect with the ball hitch via the hook, and further detail is provided in a translational arrow indicating movement of the trailer hitch from an elevation equal to the ball hitch to aligned above and adjacent to the ball hitch.
Figure 3B:
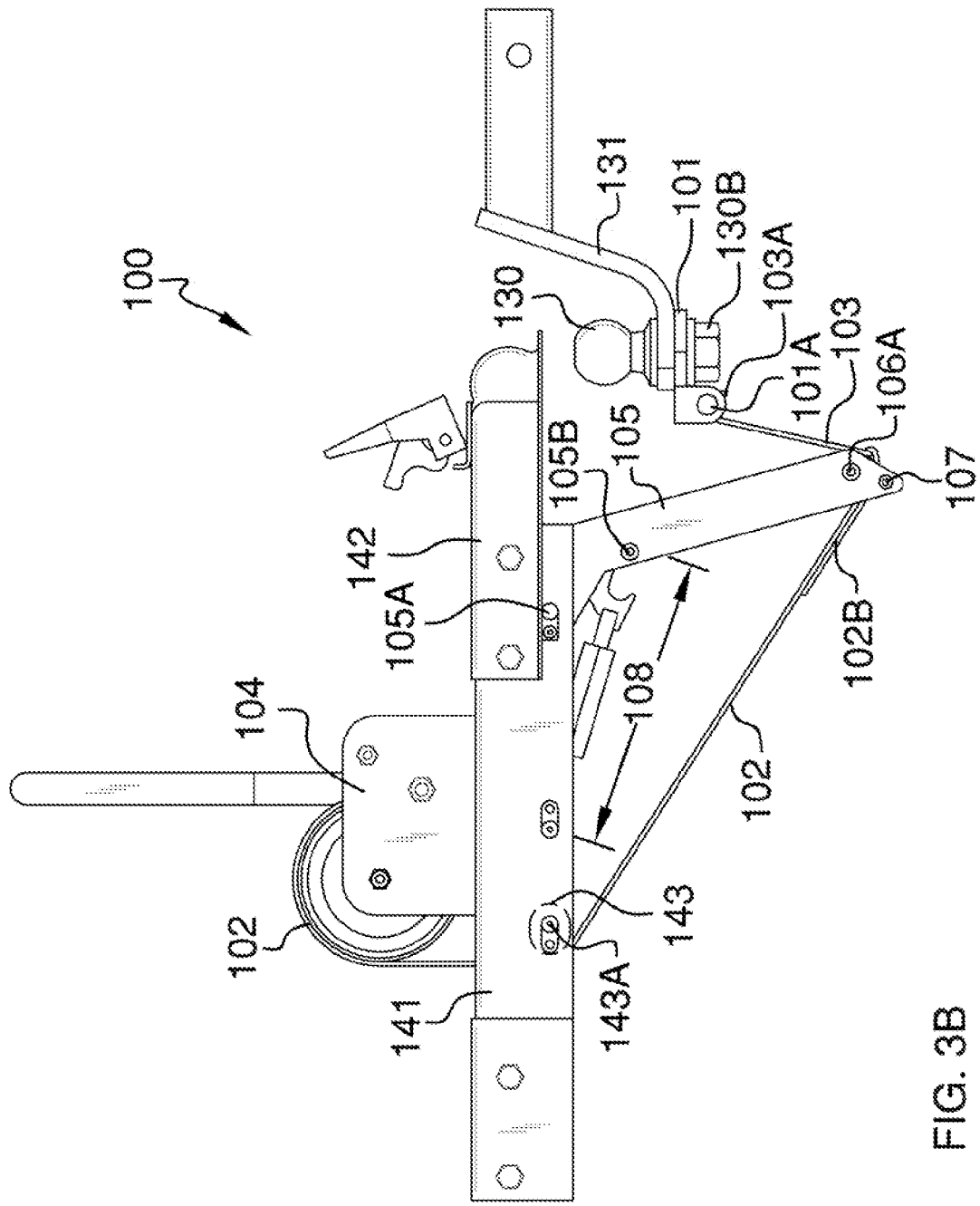
FIG. 3B illustrates a side view of the trailer hitch alignment device in which the alignment device located under the tongue of the trailer is rotated downwardly in order to illustrate the elongated strap wrapped down and around the alignment strap so as to provide proper elevation of the trailer hitch above the hitch ball.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-4. A trailer hitch alignment device 100 (hereinafter invention) includes a bracket 101 that is bolted under a ball hitch 130. The ball hitch 130 extends down from a trailer hitch ball mount 131. The trailer hitch ball mount 131 is attached to a vehicle (not shown). The ball hitch 130 features a threaded member 130A that passes through the trailer hitch ball mount 131 where the bracket 101 slides thereon, and a threaded nut 130B screws thereafter. It shall be noted that the bracket 101 has a hole 101' that enables the threaded member 130A to pass across and enables the bracket 101 to bolted to the bottom side of the trailer hitch ball mount 131.

The bracket 101 includes a rod 101A that traverses across the bracket 101. The invention 100 features an elongated strap 102 from which a first end 102A is a hook 103. The hook 103 is used to attach the elongated strap 102 to the bracket 101, and more particularly, the rod 101A that crosses the bracket 101. The hook 103 features a hook end 103A that hooks onto the rod 101A.

The elongated strap 102 is made of a woven fabric, which is typically associated with car seat belts. The elongated strap 102 features a loop 102B that encircles a loophole 103A formed in the hook 103. The loop 102B is enclosed via stitching, which is well known in the art involving car seat belts.

The invention 100 is designed to align a trailer 140, to a ball hitch 130. More particularly, the trailer 140 involves a trailer tongue 141, which is the forward most end of the trailer 140, and is responsible for connection with the hitch ball 130. Located at a distal end of the trailer tongue 141 is a trailer hitch 142. The trailer hitch 142 is widely known in the art as is the trailer tongue 141. What is also known in the art is the inconvenience associated with aligning the trailer hitch 142 onto the hitch ball 130.

Located on the trailer tongue 141 is a hand crank 104. The hand crank 104 is also well known in the art, and provides a means of mechanically winding up a strap or cable to pull an object onto the trailer 140. In the particular case here, the invention 100 employs the hand crank 104 to wind and unwind the elongated strap 102. The trailer tongue 141 includes a hole 141A that enables the elongated strap 102 to pass from the hand crank 104 located on a top side of the trailer tongue 141, through the trailer tongue 141, where the elongated strap 102 traverses across an alignment device 105 located on a bottom side of the trailer tongue 141 before venturing out to connect with the bracket 101 via the hook 102.

As mentioned above the hand crank 104 is mounted to a topside 141B of the trailer tongue 141 via fastening means 104A. The fastening means 104A comprise the use of bolts, rivets, or welding. Extending beneath the trailer tongue 141 is the alignment device 105.

Figure 4:
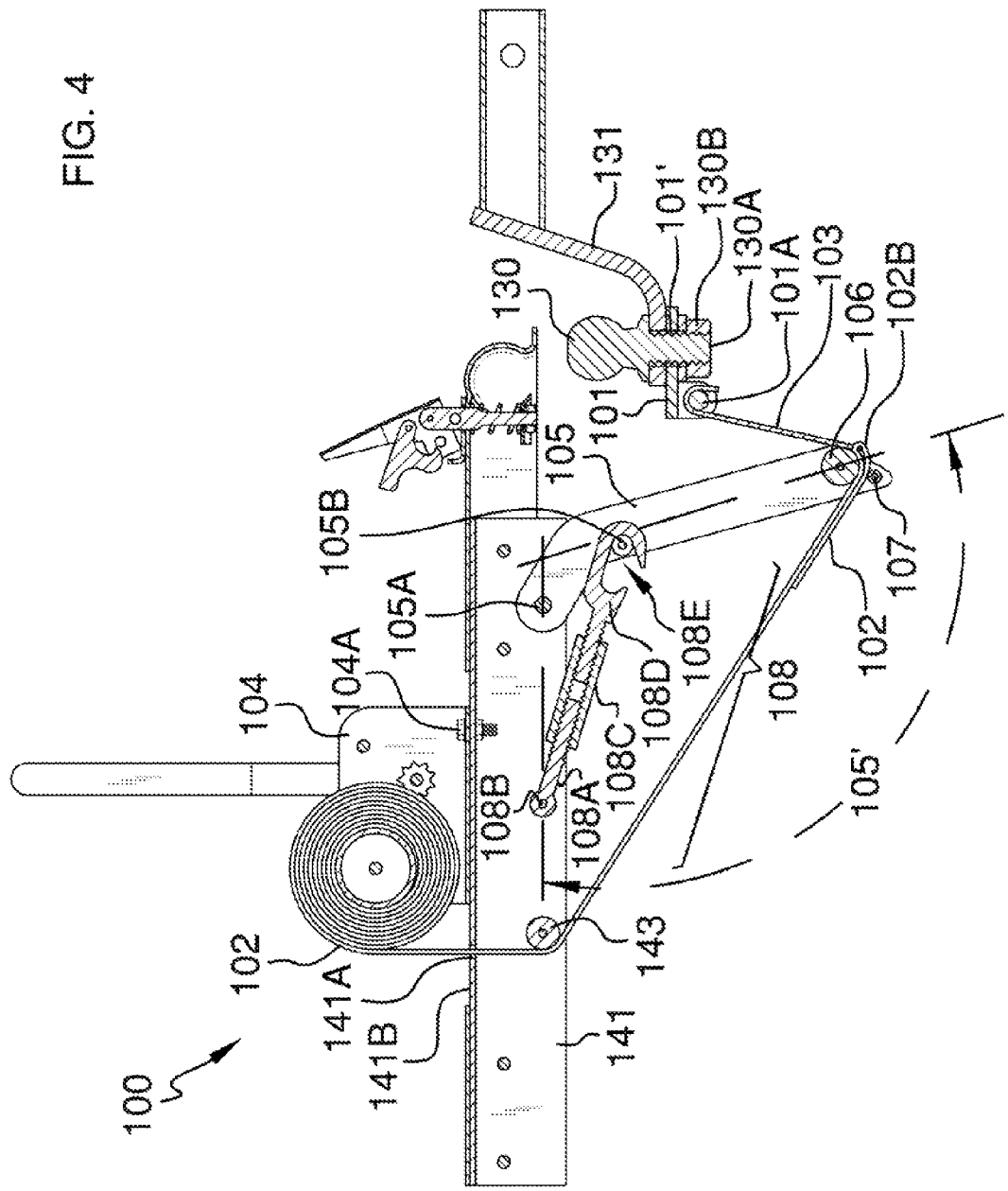
FIG. 4 illustrates a cross-sectional view of the trailer hitch alignment device in which detail is provided to the structure of the alignment device with respect to the tongue of the trailer as well as the connectivity of the bracket under the hitch ball.

The alignment device 105 is mounted to a rod 105A that traverses across the interior of the trailer tongue 141 such that the alignment guide 105 can fold up inside of the trailer tongue 141 or the alignment guide 105 can rotate downwardly as depicted in FIG. 4.

It shall be noted that the trailer tongue 141 is of a three-sided construction, and is an upside down U-shaped cross section such that the underneath portion of the trailer tongue 141 is open. That being said the alignment device 105 is attached within the hollow portion of the trailer tongue 141 and descends up and down therefrom.

The alignment device 105 is a unique and nonobvious part of the invention 100. The alignment device 105 descends from below the trailer tongue 141 and is positioned at a downward angle, and guides the elongated strap 102 to a lowered elevation with respect to the trailer tongue 141.

Referring to FIG. 4, the elongated strap 102 traverses through the hole 141A in the trailer tongue 141, and subsequently encounters a guide roller 143. The guide roller 143 rolls about a guide rod 143A that traverses across the interior of the trailer tongue 141.

Next, the elongated strap 102 traverses between an alignment guide roller 106 and a stop 107. Both the guide roller 106 and the stop 107 are mounted on the alignment device 105. The alignment guide roller 106 rolls about a guide rod 106A that traverses across the alignment guide 105. The stop 107 insures that the elongated strap 102 does not become disengaged with the alignment guide 105.

The alignment guide 105 employs the use of a lock arm 108 that enables the alignment guide 105 to rotate downwardly to an extended position as depicted in FIGS. 3 and 4. The lock arm 108 is adjustable and includes a first threaded member 108A that mounts to the trailer tongue 141 via a first rod 108B. A threaded adaptor 108C screws onto the first threaded member 108A, and a second threaded member 108D screws upon an opposing side of the threaded adaptor 108C. The second threaded member 108D features a hook 108E that can hook onto a hook rod 105B that traverses the interior of the alignment guide 105. Since the lock arm 108 is adjustable in length via the threaded members, the extended position of the alignment guide 105 can be adjusted to form an extended angle 105'.

The extended angle 105' formed by the alignment guide 105 will adjust the elevation of the trailer hitch 142 with respect to the hitch ball 130.

The hook 103 is a flat and long piece of durable construction. The hook 103 features a length 103B that impacts the location of the trailer hitch 142 with respect to the hitch ball 130 in that the hand crank 104 shall wind the elongated strap 102 until the loophole 102B of the elongated strap 102 encounters both the stop 107 and the alignment guide roller 106 (see FIG. 3A). Once the position of the trailer hitch 142 is aligned above and next to the ball hitch (see FIG. 3B), the end user would begin unwinding the hand crank 104, which would drop the trailer hitch 142 onto the hitch ball 130.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A trailer hitch alignment device comprising:
   an alignment device that descends from below a trailer tongue to lock in at an alignment angle there under;
   an elongated strap winds upon a hand crank and travels around the alignment device;
   wherein a hook located at a first end of the elongated strap shall hook onto a bracket that is mounted under the ball hitch;
   whereupon winding the elongated strap onto the hand crank, the trailer hitch is moved to an elevation above and adjacent the ball hitch;
   wherein the bracket is bolted under the ball hitch; wherein the ball hitch includes a threaded member that extends through a trailer hitch ball mount; wherein the bracket is placed underneath the trailer hitch ball mount before screwing on a threaded nut to secure both the ball hitch and the bracket to the trailer hitch ball mount;
   wherein the bracket includes a rod that traverses across the bracket, and which the hook hooks onto the rod;
   wherein a lock arm extends between the alignment device and the trailer tongue to provide a means of locking an extended angle formed between the alignment device and the trailer tongue;
   wherein the lock arm can adjust its length, which in turn adjusts the extended angle thereby altering the elevation of the trailer hitch with respect to the ball hitch.

2. The trailer hitch alignment device as described in claim 1 wherein the hand crank is attached to a top side of the trailer tongue via a fastening means comprising bolting, riveting or welding.

3. The trailer hitch alignment device as described in claim 2 wherein the trailer tongue includes a hole that enables the elongated strap to pass through before winding across the alignment device.

4. The trailer hitch alignment device as described in claim 3 wherein the alignment device is mounted to a rod that traverses across an interior of the trailer tongue such that the alignment guide can fold up inside of the trailer tongue or the alignment guide can rotate downwardly to an extended position.

5. The trailer hitch alignment device as described in claim 4 wherein the trailer tongue includes a guide roller that rolls about a guide rod spanning the trailer tongue.

6. The trailer hitch alignment device as described in claim 5 wherein the elongated strap traverses between an alignment guide roller and a stop that are both mounted on the alignment device.

7. A trailer hitch alignment device comprising:
   an alignment device that descends from below a trailer tongue to lock in at an alignment angle there under;
   an elongated strap winds upon a hand crank mounted on a top side of the trailer tongue, and travels around the alignment device;
   wherein the trailer tongue includes a hole that enables the elongated strap to pass through before winding across the alignment device;
   wherein a hook located at a first end of the elongated strap shall hook onto a bracket that is mounted under the ball hitch;
   wherein the bracket includes a rod that traverses across the bracket, and which the hook hooks onto the rod;
   whereupon winding the elongated strap onto the hand crank, the trailer hitch is moved to an elevation above and adjacent the ball hitch.

8. The trailer hitch alignment device as described in claim 7 wherein the bracket is bolted under the ball hitch; wherein the ball hitch includes a threaded member that extends through a trailer hitch ball mount; wherein the bracket is placed underneath the trailer hitch ball mount before screwing on a threaded nut to secure both the ball hitch and the bracket to the trailer hitch ball mount.

9. The trailer hitch alignment device as described in claim 8 wherein the alignment device is mounted to a rod that traverses across an interior of the trailer tongue such that the alignment guide can fold up inside of the trailer tongue or the alignment guide can rotate downwardly to an extended position.

10. The trailer hitch alignment device as described in claim 9 wherein the trailer tongue includes a guide roller that rolls about a guide rod spanning the trailer tongue.

11. The trailer hitch alignment device as described in claim 10 wherein the elongated strap traverses between an alignment guide roller and a stop that are both mounted on the alignment device.

12. The trailer hitch alignment device as described in claim 11 wherein a lock arm extends between the alignment device and the trailer tongue to provide a means of locking an extended angle formed between the alignment device and the trailer tongue.

13. The trailer hitch alignment device as described in claim 12 wherein the lock arm can adjust its length, which in turn adjusts the extended angle thereby altering the elevation of the trailer hitch with respect to the ball hitch.

14. The trailer hitch alignment device as described in claim 7 wherein the hand crank is attached to the top side of the trailer tongue via a fastening means comprising bolting, riveting or welding.

\* \* \* \* \*